July 13, 1943. P. R. VON SCHNEEWEISS ET AL 2,324,251
RESILIENT WHEEL
Filed April 23, 1942

Inventors
Peter R. Von Schneeweiss,
Hans F. Klaholz,

By J. Stanley Burch
Attorney

Patented July 13, 1943

2,324,251

UNITED STATES PATENT OFFICE 2,324,251

RESILIENT WHEEL

Peter R. von Schneeweiss and Hans F. Klaholz, Cleveland, Ohio

Application April 23, 1942, Serial No. 440,226

3 Claims. (Cl. 152—33)

This invention relates to vehicle wheels, and has more particular reference to a resilient wheel for use upon land vehicles of various kinds.

The primary object of the present invention is to provide a resilient wheel embodying a rigid inner rim and a flexible outer rim, together with a novel system of springs between the rims, whereby the desired degree of resiliency is obtained without the use of a pneumatic tire.

The present invention consists in the novel form, combination and arrangement of parts hereinafter more fully described, shown in the accompanying drawing and claimed.

Figure 1:
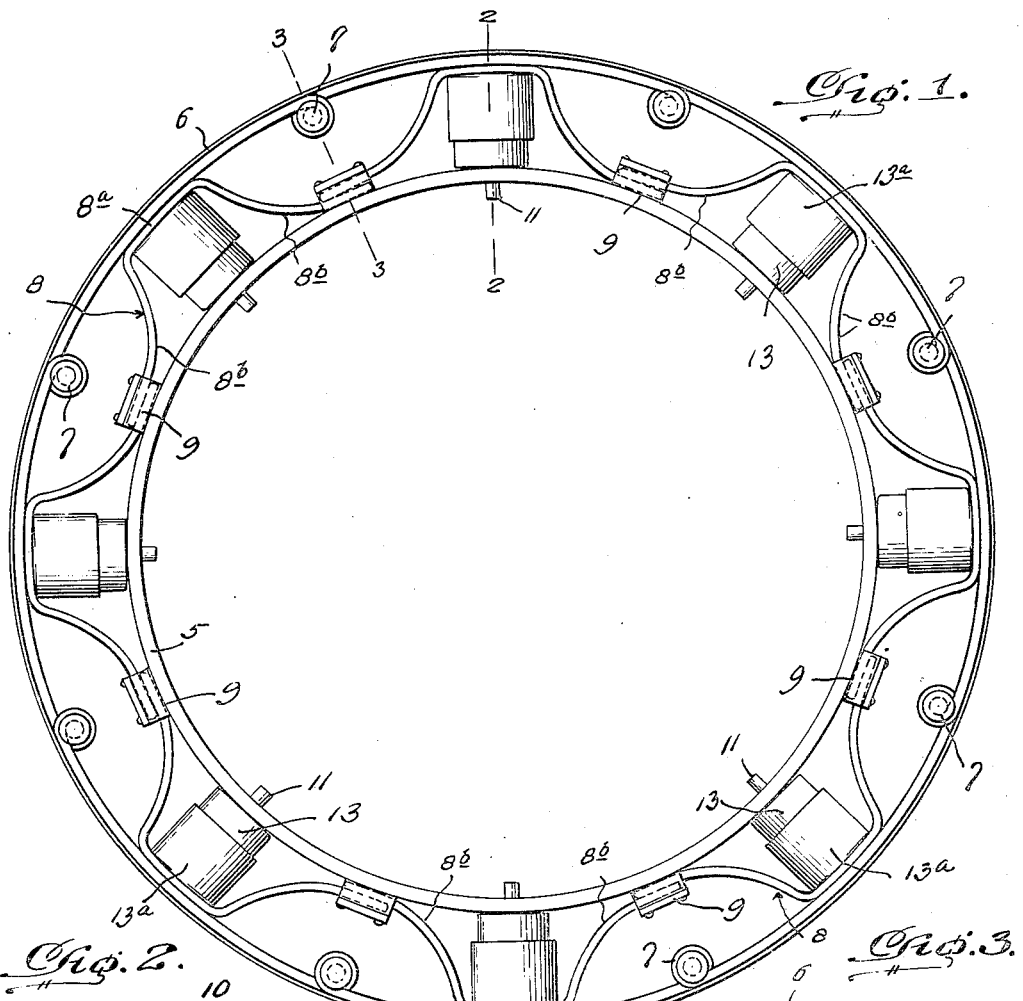
Figure 1 is a side elevational view of a vehicle wheel constructed in accordance with the present invention, the usual hub and spokes being omitted.
Figure 2:
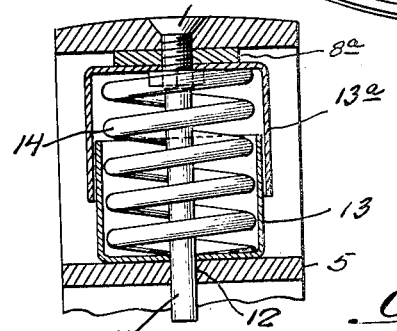
Figure 2 is an enlarged transverse section taken on line 2—2 of Figure 1.
Figure 3:
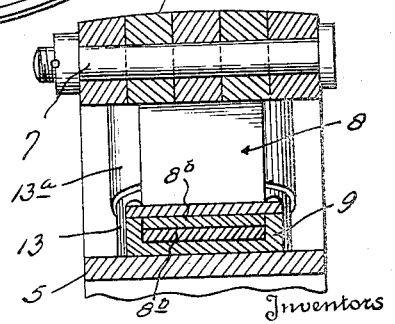
Figure 3 is a similar view taken on line 3—3 of Figure 1.
Figure 4:
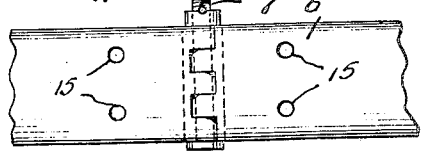
Figure 4 is a fragmentary plan view showing the hinge connection between the pivotally connected sections of the flexible outer rim.

Referring in detail to the drawing, the present invention contemplates a resilient vehicle wheel embodying a rigid inner rim 5 composed of a continuous band of metal to which the outer ends of the usual spokes may be fixed in any preferred manner, which spokes will radiate from a hub in the usual way, not shown. Surrounding the inner rim 5 is a flexible outer rim 6 composed of a plurality of relatively long arcuate sections hingedly connected together at their ends as at 7.

A novel system of springs is provided between the rims 5 and 6 to afford the desired degree of resiliency without the use of a pneumatic tire. As shown, there is a spring system in the form of a series of leaf springs 8 having relatively long inwardly curved end portions 8b connected by relatively shorter arcuate portions 8a, the portions 8b being held to the inner rim 5 by means of guides 9 in which the ends of the spring portions 8b are slidably overlapped. The connecting portions 8a of the leaf springs are fixed to the outer rim, one centrally of each rim section 6 by means of a screw 10 piercing said rim section 6. Each screw 10 has a smooth stem extension 11 that projects inwardly and slidably and loosely extends through a relatively large slot in the inner rim 5 as at 12, so as to aid in maintaining the rims against relative lateral displacement. The stem extensions 11 of the screws 10 extend radially through casings composed of slidably telescoped sections 13 and 13a which house helical compression springs 14 interposed between the rims to yieldingly resist inward flexing of the outer rim section under load and thereby supplement the action of the main springs 8. By reason of the loose fit of the stem extensions 11 in the openings of inner rim 5, and the slidable engagement of the ends of spring portions 8b in guides 9, the necessary limited amount of relative circumferential movement of the rims is permitted. In use, the greatest amount of deformation of the outer rim will occur at the bottom where the wheel contacts the ground, such deformation being permitted by the flexing of one or more rim sections at this point as allowed by the hinge connections 7 between the sections of the outer rim. At the same time, the leaf springs will act in conjunction with the compression springs 14 to resist load at the top of the wheel, so that all of the load is never borne by any one compression spring or any single leaf spring.

It will be seen that the construction is quite simple and extremely durable, the parts being so combined, formed and arranged as to insure highly efficient action.

The rim sections 6 are apertured at 15 so that skid chains, traction bars, or rubber treads may be attached thereto.

What we claim as new is:

1. A resilient vehicle wheel comprising a rigid continuous inner rim, a flexible outer rim embodying a plurality of similar relatively long hingedly connected sections, and a system of springs between said rims including a series of leaf springs disposed centrally between the side edges of said rims and having similar relatively long inwardly curved end portions connected by relatively short arcuate intermediate portions, said inwardly curved end portions being longitudinally slidable relative to and connected to the inner rim at points radially opposed to the hinged connections between the sections of the outer rim, and means rigidly connecting the relatively short arcuate intermediate portions of said leaf springs with the outer rim sections intermediate the ends of the latter.

2. A resilient vehicle wheel comprising a rigid continuous inner rim, a flexible outer rim embodying a plurality of similar relatively long hingedly connected sections, and a system of springs between said rims including a series of leaf springs disposed centrally between the side edges of said rims and having similar relatively long inwardly curved end portions connected by relatively short arcuate intermediate portions, said inwardly curved end portions being longitudinally slidable relative to and connected to the inner rim at points radially opposed to the hinged connections between the sections of the outer rim, and means rigidly connecting the relatively short arcuate intermediate portions of said leaf springs with the outer rim sections intermediate the ends of the latter, said inner rim having guides fixed thereto and affording the means for connecting the inwardly curved portions of the springs wtih the inner rim for slidable movement relative to the latter, the free ends of the inwardly curved portions of adjacent springs being overlapped within said guides.

3. A resilient vehicle wheel comprising a rigid continuous inner rim, a flexible outer rim embodying a plurality of similar relatively long hingedly connected sections, and a system of springs between said rims including a series of leaf springs disposed centrally between the side edges of said rims and having similar relatively long forwardly curved end portions connected by relatively short arcuate intermediate portions, said inwardly curved end portions being longitudinally slidable relative to and connected to the inner rim at points radially opposed to the hinged connections between the sections of the outer rim, and means rigidly connecting the relatively short arcuate intermediate portions of said leaf springs with the outer rim sections intermediate the ends of the latter, casings interposed between the inner and outer rims at the points where the shorter connecting portions of the leaf springs occur, helical compression springs arranged between the rims within said casings and acting to expand the latter, and guide pins rigid with the outer rim section and extending inwardly axially of said compression springs and casings and loosely slidable through the inner rim.

PETER R. von SCHNEEWEISS.
HANS F. KLAHOLZ.